Figure 1:
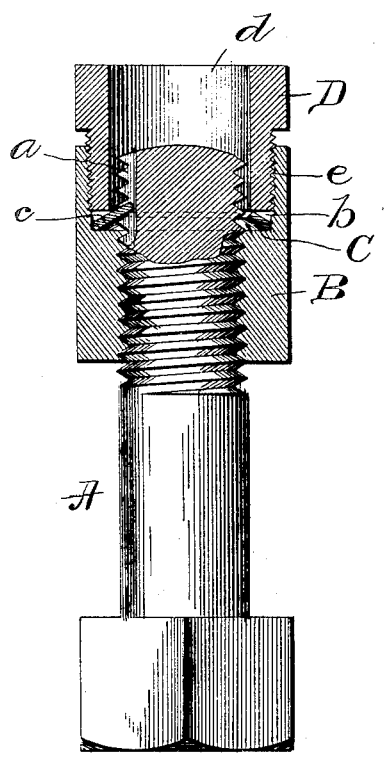

No. 675,664. Patented June 4, 1901.
O. C. MOORE.
LOCK NUT.
(Application filed Oct. 12, 1900.)
(No Model.)

Witnesses
Marcus L. Byng.
C. E. Mirriam.

Inventor
Otho C. Moore
By J. S. Barker
Attorneys

UNITED STATES PATENT OFFICE.

OTHO C. MOORE, OF NORFOLK, VIRGINIA, ASSIGNOR OF ONE-HALF TO JAMES BARKLEY, OF SAME PLACE.

LOCK-NUT.

SPECIFICATION forming part of Letters Patent No. 675,664, dated June 4, 1901.

Application filed October 12, 1900. Serial No. 32,805. (No model.)

*To all whom it may concern:*

Be it known that I, OTHO C. MOORE, a citizen of the United States, residing at Norfolk, in the county of Norfolk and State of Virginia, have invented new and useful Improvements in Lock-Nuts, of which the following is a specification.

My invention has for its object to produce a lock-nut having certain improved features of construction and mode of operation to be hereinafter pointed out, and which is illustrated in the drawings, such lock-nut being adapted for use under a great variety of circumstances in a great many positions, among which may be mentioned locking the nuts upon the bolts of cylinder-heads and the securing of the nuts upon the ends of vehicle-axles.

For the sake of a better understanding of my invention I have illustrated one embodiment thereof in the accompanying drawings; but I have not attempted to illustrate all the different embodiments thereof, as they would be largely matters of mechanical detail, depending upon the particular use to which the invention is put, the purpose of the drawings being to illustrate the principle of the invention without limiting it to details of construction incident to specific embodiments thereof.

Figure 2:
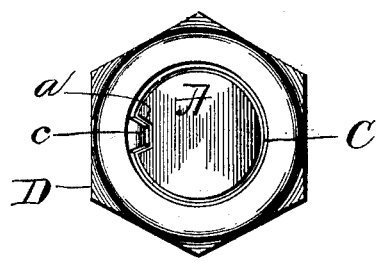
Figure 3:
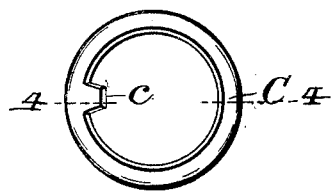
Figure 4:
Figure 5:
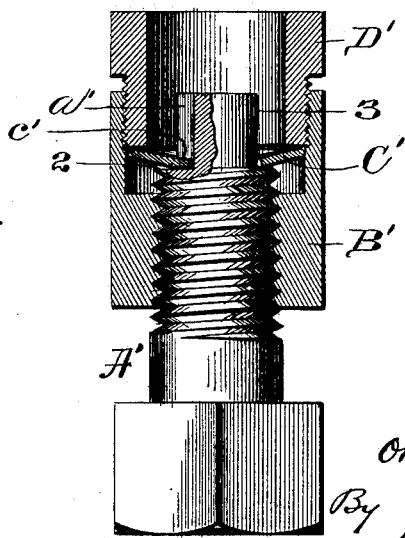

In the said drawings, Figure 1 is a sectional elevation of a lock-nut embodying my improvements. Fig. 2 is a top plan view of the same. Fig. 3 is a detail plan view of the locking-washer. Fig. 4 is a cross-sectional view of the washer, taken on the line 4 4 of Fig. 3; and Fig. 5 is a vertical section of another form of my invention.

In the drawings, A represents a bolt or machine-screw. It is formed with a channel or groove $a$, which extends to a greater or less extent longitudinally of the screw-threaded part of the bolt.

B represents the nut, which is threaded to engage with the bolt. It is of a greater thickness than are the nuts ordinarily in use, and its outer portion is chambered concentric with its screw-threaded portion, as at $b$. An annular key, washer, or locking-plate C is arranged within the chambered portion of the nut B, and a nut or plug D is arranged to force the washer C into engagement with the bolt, and thereby prevent the accidental turning of the nut B upon its screw. The key or locking-washer C is dished, as represented in the drawings, and is provided with an inward-extending lug or tongue $c$, the end of which is adapted to rest within the groove or channel $a$. The washer C is of such size that its outer edge rests against the shoulder formed at the bottom of the chamber $b$ in the nut B, and the hole through the washer is of such size that the inner edge of the washer when it is put in place just escapes the periphery or screw-threaded portion of the bolt.

The nut or plug D, which operates upon the washer or locking-key C, preferably engages with the nut B by means of screw-threads $e$, cut, respectively, in an inner wall of the chambered portion $b$ of the nut B and on the outer face of a reduced portion of the nut or plug D. The pitch of the screw-threads $e$ I prefer should be less than the pitch of the threads upon the bolt or screw A. This nut D has a central longitudinal aperture $d$ of a size to permit it to pass freely over the screw-threaded portion of the bolt without engaging therewith.

In order to lock the nut B, it is first set tightly against the object which it is to confine. The washer C is then inserted into the outer chambered end of the nut, its tongue $c$ resting in the groove $a$ of the bolt and sliding freely therein, and the nut or plug D is screwed into the recess B in the bolt until its end comes into engagement with the upper surface of the washer. If now the nut or plug D be screwed farther into the nut B, the washer will be flattened out, forcing the tongue into engagement with the bolt and bending it. The friction which is incident to this operation will be sufficient to prevent the nut B from working loose under the ordinary jars and strains to which it is subjected, and if it is desired at any time to remove the nut the nut or plug D may be loosened, allowing the washer to resume its normal shape, when the nut B may be easily turned. If the plug be driven against the washer with great force, the latter will be flattened out, so that its inner edge will engage with the screw-thread, and the size of the central opening through the washer may be such that when flattened out, as just described, it will so mar the screw-thread of the bolt or screw as to render it practically impossible to remove the nut without destroying the thread. The method of locking the nut last described could be employed with a locking plate or washer which is made without the lug or tongue c; but ordinarily I prefer to construct the parts as shown.

In Fig. 5 I have shown a somewhat different form of my invention. In this view, A' represents the bolt; B', the nut; C', the locking washer or key, and D' the nut or plug which forces the washer into locking engagement with the nut and bolt. The bolt B' is chambered and screw-threaded to receive the reduced screw-threaded portion of the nut or plug D'. The washer or locking-key C is of annular cup or dish shape and instead of resting upon the bottom of the chamber in the nut B' is supported upon a shoulder 2, formed near the end of the bolt. The bolt is provided with an extension 3 beyond the shoulder 2 of reduced size, and this is formed with a longitudinal groove $a^2$ to receive a tongue carried by the key or washer C'. After the nut B' has been screwed into place the washer C' is placed over the stem 3 of the bolt and occupies a position within the chamber of the nut, its outer edge just escaping engagement therewith. If now the plug or nut D be screwed into the chamber of the nut B until it engages with the washer or locking annular key, it will force the latter outward into engagement with the nut and effect a locking action between the bolt and nut.

It will be understood that a split key or washer instead of an annular undivided key or washer, as I have shown in the drawings, might be used in each form of my invention. I prefer, however, the form shown—that is, an undivided annular cup or dish shaped locking-washer.

Having described my invention, what I claim, and desire to secure by Letters Patent, is—

1. The combination with a screw-threaded bolt and a nut which engages therewith, of a locking key or washer, and means carried by the nut for forcing the washer into locking engagement with the bolt and the nut, substantially as set forth.

2. The combination with a screw-threaded bolt, of a nut engaging therewith and provided with a chamber which is substantially concentric with the threaded aperture in the nut, a locking key or washer arranged to be seated in the said chamber, and means for forcing the key or washer into engagement with both the nut and the bolt, substantially as set forth.

3. The combination with a screw-threaded bolt, of a nut adapted to engage therewith, and formed with a chambered portion substantially concentric with the threaded aperture therein, a key or locking-washer adapted to be placed within the chamber of the nut, and a nut or plug having screw-threaded engagement with the first-mentioned nut and adapted to engage with the said locking key or washer, and force it into engagement with the nut and bolt, substantially as set forth.

4. The combination with a screw-threaded bolt of a chambered nut, an annular dish-shaped locking key or washer adapted to be inserted within the chamber of the nut, and means for bearing upon the said washer and forcing it into engagement with the nut and bolt, substantially as set forth.

5. The combination with a screw-threaded bolt, of a nut B adapted to engage therewith formed with the chamber $b$ in one end, a locking key or washer of annular shape adapted to be inserted in the bottom of the said chamber, and a plug or nut D having screw-threaded engagement with the nut B, and arranged to be forced into engagement with the said key or washer, the plug or nut D being formed with a central aperture whereby it is adapted to pass over the screw-threaded portion of the bolt without engaging therewith, substantially as set forth.

6. The combination of a screw-threaded bolt formed with a longitudinal channel or groove $a$, a nut B arranged to engage with the bolt and formed with a chamber $b$ in one end, which is screw-threaded as at $e$, an annular washer or locking-key C adapted to fit into the lower end of the said chamber, and provided with a tongue $c$ arranged to fit into the groove $a$ in the bolt, and a nut or plug D arranged to be screwed into the chambered end of the nut B and to bear upon the washer or locking-key and forcing it against the bolt and the nut B, substantially as set forth.

OTHO C. MOORE.

Witnesses:
GEO. T. MAY, Jr.,
C. E. MERRIAM.